United States Patent [19]

Endo et al.

[11] Patent Number: 4,813,336
[45] Date of Patent: Mar. 21, 1989

[54] PNEUMATIC BOOSTER

[75] Inventors: Mitsuhiro Endo, Kanagawa; Hiromi Ando; Yukou Ono, both of Tokyo, all of Japan

[73] Assignee: Tokico Ltd., Kanagawa, Japan

[21] Appl. No.: 25,279

[22] Filed: Mar. 12, 1987

Related U.S. Application Data

[62] Division of Ser. No. 713,029, Mar. 18, 1985, Pat. No. 4,671,167.

[30] Foreign Application Priority Data

Mar. 19, 1984 [JP] Japan ................................. 59-52845
Mar. 19, 1984 [JP] Japan ................................. 59-52846

[51] Int. Cl.$^4$ ............................................. F15B 9/10
[52] U.S. Cl. ............................... 91/369.4; 91/376 R
[58] Field of Search ............ 91/369 A, 369 B, 369 C, 91/364, 379, 386, 389; 60/554

[56] References Cited

U.S. PATENT DOCUMENTS 4,086,842 5/1978 Kytta ................................. 91/369
4,493,243 1/1985 Horibe ............................ 91/369 B

FOREIGN PATENT DOCUMENTS 0097865 1/1984 European Pat. Off. .
2421773 11/1979 France .
58-221755 12/1983 Japan .
58-221756 12/1983 Japan .
58-221757 12/1983 Japan .

Primary Examiner—Robert E. Garrett
Assistant Examiner—Thomas Denion
Attorney, Agent, or Firm—Wenderoth, Lind & Ponack

[57] ABSTRACT

A pneumatic booster including a housing, a power piston partitioning the interior of the housing into a front chamber and a rear chamber, with the front chamber being connected permanently to a source of a first reference pressure, the rear chamber being selectively communicated with the front chamber and a source of second reference pressure which is higher than the first reference pressure through a valve mechanism, an output shaft receiving the output force from the power piston, and an input shaft receiving an input force for actuating said valve mechanism and receiving a reaction force of the output force. There are provided a device between the output shaft and the power piston for changing the reaction force with respect to the output force on the output shaft, a mechanism for rotating the output shaft around the axis thereof, and a device for preventing the rotation of the power piston relative to the housing at least at the non-actuated condition of the pneumatic booster.

1 Claim, 5 Drawing Sheets

4,813,336

PNEUMATIC BOOSTER

This application is a divisional of Ser. No. 713,029, filed Mar. 18, 1985, now U.S. Pat. No. 4,671,167.

BACKGROUND OF THE INVENTION

This invention relates to a pneumatic booster, and particularly to a pneumatic booster for use in a hydraulic braking system of a vehicle such as an automobile wherein the pneumatic booster is interposed between a brake pedal and a hydraulic master cylinder for increasing the force applied on the brake pedal by utilizing vacuum pressure in an intake manifold of an engine or pressurized air of an engine driven air pump thereby transmitting the increased force to the master cylinder and generating hydraulic pressure in the master cylinder.

In a conventional pneumatic booster the boost ratio or the ratio between the output force and the input force is fixed. Thus, when the pneumatic booster is incorporated in a braking system of a truck, the braking effect attained on the vehicle will differ substantially between a heavy loaded condition and light loaded condition. In other words, it is required to increase the braking force or the braking pressure in the heavy loaded condition as compared with the light loaded condition with respect to the same brake applying force.

SUMMARY OF THE INVENTION

This invention aims to satisfy aforesaid requirement and, according to the invention, there are provided a device for changing the reaction force transmitted to an input shaft with respect to the output force on an output shaft, a mechanism for rotating the output shaft around the axis thereof, and a device for preventing the rotation of a power piston with respect to a housing at least in the nonactuated condition to the pneumatic booster, in a pneumatic booster of the type including the housing, the power piston partitioning the interior of the housing into a front chamber and a rear chamber, the front chamber being connected permanently to a source of a first reference pressure, the rear chamber being selectively communicated with the front chamber and a source of second reference pressure which is higher than the first reference pressure through a valve mechanism, the output shaft receiving the output force from the power piston, and the input shaft receiving the input force for actuating the valve mechanism and receiving reaction force of the output force.

According to one preferred embodiment of the invention, the device changing the reaction force comprises a lever mounted on the front surface of the power piston and extending radially with respect to the input and the output shafts, said lever having a first portion abutting with the input shaft and a second portion abutting with the output shaft, said first portion being located radially inwards of said second portion, and at least one of said first and second portions being displaceable in the radial direction. Preferably, a plurality of radial projections having different radial heights are provided on the output shaft for selectively abutting with said lever to define said second portion, whereby, the second portion is displaced by rotating the output shaft with respect to the power piston.

According to another embodiment of the invention, a resilient reaction disc is interposed between the rear end of the output shaft and the front end of the input shaft, and the front surface of the reaction disc abuts with a plurality of separate members at least one of which is selectively engageable with the output shaft in transmitting the output force from the reaction disc to the output shaft.

BRIEF EXPLANATION OF THE DRAWINGS

Further objects and advantages of the invention will become apparent from the following descriptions taken with reference to the drawings exemplifying some preferred embodiments, in which.

DETAILED DESCRIPTION OF THE PREFERRED EMBODIMENTS

Figure 1:
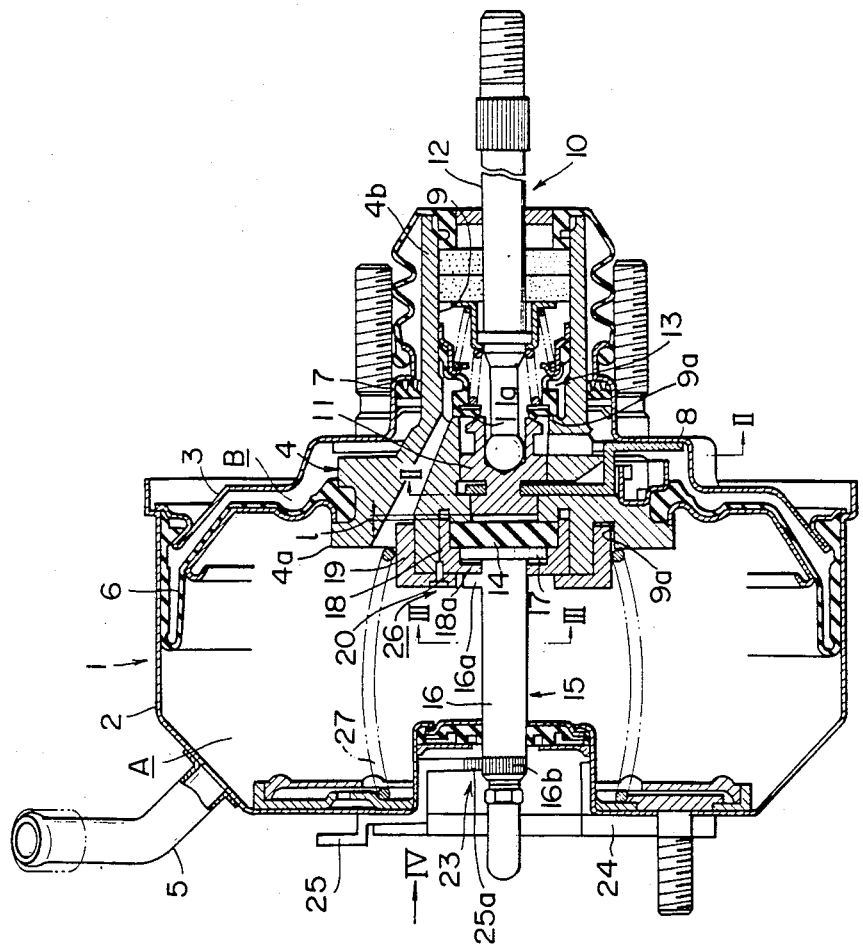
FIG. 1 is a longitudinal sectional view of a pneumatic booster according to the invention.

A pneumatic booster shown in FIG. 1 comprises a housing 1 consisting of a front shell 2 and a rear shell 3, and a power piston 4 displaceably mounted on the rear shell 3 and cooperating with a flexible diaphragm 6 and a piston plate to partition the interior of the housing into a front chamber A and a rear chamber B. The front chamber A is connected permanently with a source of vacuum pressure such as an intake manifold of an engine (not shown) through a connecting pipe 5. The power piston 4 has a rearwardly extending small diameter portion 4b which is sealingly and slidably supported on the rear shell 3 through a seal 7. The power piston 4 has a central bore 9 receiving therein an input shaft 10 and a valve mechanism associated therewith. The input shaft 10 consists of an input rod 12 and a plunger 11. The rear end of the input rod 12 projects rearwards of the power piston 4 and is connected to a brake pedal (not shown). The plunger 11 is slidably received in a corresponding diameter portion of the bore 9.

The valve mechanism consists of a poppet valve 13 formed of a resilient material, an annular valve seat 9a formed as a rearwardly facing shoulder in the bore 9, and an annular valve seat 11a formed on the rear end of the plunger 11. The valve mechanism intercepts the communication between chambers A and B when the poppet valve 13 seats on the valve seat 9a and intercepts the communication between the chamber B and atmospheric pressure when the poppet valve 13 seats on the valve seat 11a. In the embodiment, the atmospheric air can be introduced into the rear chamber B through an opening formed in the rear end of the power piston 4, air cleaners, an annular space between the inner circumference of the poppet valve 13 and the outer periphery of the input rod 12, a clearance formed between the poppet valve 13 and the valve seat 11a, and axial and radial passages formed in the valve body 4. Shown at 8 in FIG. 1 is a stop member mounted on the power piston 4 and restricting the rearward (rightward in FIG. 1) movement of the plunger 11 with respect to the rear shell 3 when input force applied on the input shaft 10 is released and the input shaft 10 returns to the non-actuated condition shown in FIG. 1.

Figure 3:
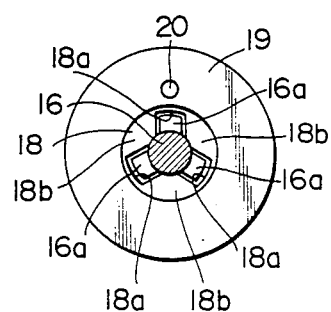
FIG. 3 is a partial sectional view as viewed along line III—III in FIG. 1.

A reaction disc 14 formed of a resiliently deformable material is mounted in the forward end of the bore 9. In the non-actuated condition of the booster, or when no input force is applied on the input shaft 10, a small clearance is formed between the reaction disc 14 and the plunger 11. An output shaft 15 slidably projects through the front shell 2 to the outside of the booster. The output shaft 15 is coaxial with the input shaft 10. The output shaft 15 includes a main body portion 16, a pressure plate portion 17 having a diameter smaller than that of the reaction disc 14, and three circumferentially spaced radial projections 16a formed on the outer circumference of the main body portion 16. The outer circumferential portion of the front surface of the reaction disc 14 engages with an annular member 18 which is axially slidably mounted in the power piston 4. The annular member 18 is slidably received in a corresponding bore in the power piston 4 and relative rotation therebetween is prevented by a key 20. The annular member 18 has a bore portion for slidably receiving the pressure plate portion 17 of the output shaft 15. Further, in the embodiment, the annular member 18 has a bore portion for receiving the outer circumference of the reaction disc 14, but the reaction disc 14 may directly be mounted in a bore in the power piston with the front surface thereof engaging with the annular member 18 and the pressure plate portion 17. A stop member 19 is mounted on the power piston 4 to prevent the annular member 18 from escaping. The annular member 18 has a radially inwardly projecting flange portion to cooperate with projections 16a on the output shaft 15. The flange portion consists of three circumferentially spaced cutouts 18a and three circumferentially spaced solid portions 18b as shown in FIG. 3. When cutout portions 18a align respectively with projections 16a as shown in FIG. 3, the annular member 18 does not act to transmit the force between the reaction disc 14 and the output shaft 15 so that the force is transmitted from the reaction disc 14 to the output shaft 15 solely through the pressure plate portion 17. When the output shaft 15 is rotated by 60 degrees from the condition shown in FIG. 3, the solid portions 18b face respectively projections 16a, and the force is transmitted from the reaction disc 14 to the output shaft 15 through the pressure plate portion 17 and the annular member 18. Thus, the effective contacting area between the reaction disc 14 and the output shaft 15 changes and, as the result, the ratio between the output force and the input force changes.

Figure 4:
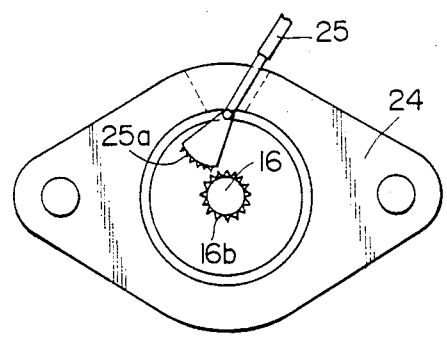
FIG. 4 is a partial end view as viewed from the direction IV in FIG. 1.

To rotate the output shaft 15, there is provided a rotating mechanism 23 as shown in FIGS. 1 and 4. The mechanism 23 comprises a lever 25 rotatably mounted on a spacer 24 which is integrally mounted on the front shell 2. The lever 25 has a toothed portion 25a on the radially inner end for meshingly engaging with a toothed portion 15a formed on the outer circumference of the output shaft 15. In the embodiment, the mechanism 23 can rotate the output shaft 15 by 60 degrees.

Figure 2:
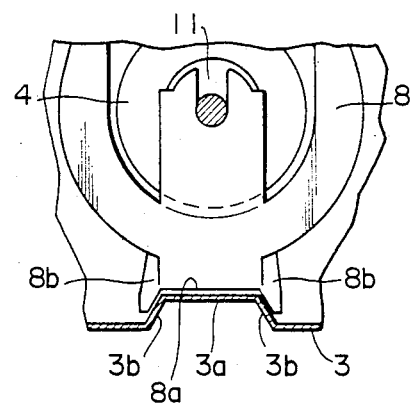
FIG. 2 is a partial transverse sectional view as viewed along line II—II in FIG. 1.

In rotating the output shaft 15, it is preferable to reliably prevent the rotation of the power piston 4. For the purpose, the stop member 8 is provided with flat bottom portion 8a and downwardly projecting portions 8b on the lower rear end portion, as shown in FIG. 2, for engaging with correspondingly shaped portions 3a and 3b on the inner surface of the rear shell 3 in the non-actuated condition of the pneumatic booster.

Figure 5:
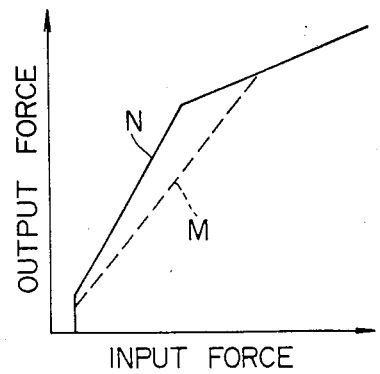
FIG. 5 is a characteristic diagram of the pneumatic booster of FIG. 1.

In operation, when projections 16a on the output shaft 15 face respectively cutout portions 18a in the annular member 18 as shown in FIG. 3, and the brake pedal is depressed, then, the input shaft 10 displaces forward to actuate the valve mechanism such that the communication between chambers B and A is intercepted and the atmospheric air is introduced into the chamber B. The power piston 4 receives a differential pressure between chambers B and A, and an output force is transmitted to the output shaft 15 through the reaction disc 14 and through the pressure plate portion 17. A reaction force is transmitted to the input shaft 10 through the reaction disc 14. The relationship between the input force and the output force is shown by broken line M in FIG. 5.

When the output shaft 15 is rotated relative to the annular member 18 by 60 degrees from the condition of FIG. 3, the projections 16a on the output shaft 15 face respectively solid flange portion 18b on the annular member 18, and when the brake pedal is depressed, then, similarly to aforesaid case, a differential pressure is generated between chambers B and A, and an output force is transmitted to the output shaft 15 from the power piston 4 to the output shaft 15. But, in this case, the force is transmitted through the reaction disc 14 and the pressure plate portion 17 and also through the reaction disc 14, the annular member 18, the solid flange portions 18b on the annular member 18 and projections 16a on the output shaft 15. Thus, the effective contacting surface area between the reaction disc and the output shaft 15 increases, and the characteristics in this condition is shown by line N in FIG. 5.

Similar to a conventional pneumatic booster, when an input force is applied on the input shaft 10, the input shaft actuates the valve mechanism to generate between chambers B and A a differential pressure corresponding to the output force, and the power piston 4 moves forward by an amount determined by the characteristics of the master cylinder connected to the output shaft. When the input force is released the power piston 4, the input shaft 10 and the like retract by the force of the return spring 27 to the non-actuated condition shown in FIG. 1.

FIGS. 6–9 show a second embodiment of the invention. Since the embodiment is generally similar to the first embodiment, parts similar to the first embodiment are denoted by the same reference numerals and a detailed explanation thereof is omitted.

Figure 6:
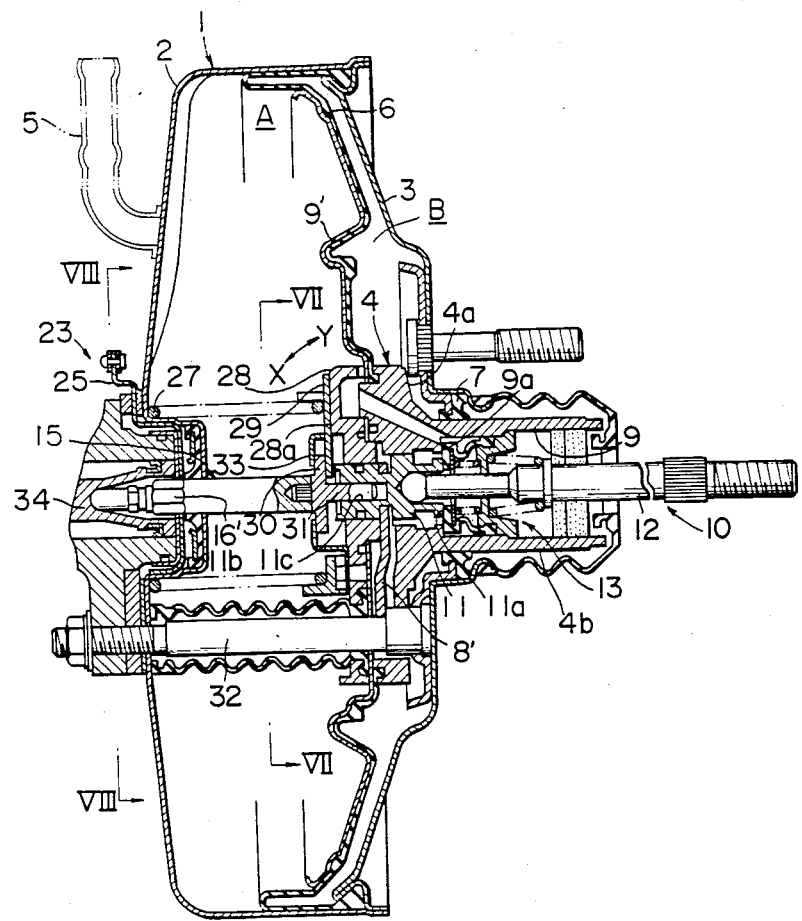
FIG. 6 is a longitudinal sectional view of a pneumatic booster according to a second embodiment of the invention.

As shown in FIG. 6, the power piston 4 consists of a main body having a large diameter portion 4a and reduced diameter portion 4b, a piston head member 28 rigidly secured to the front surface of the main body, and the piston plate 9' clamped together with the flexible diaphragm 6 between the power piston main body and the piston head member. The plunger 11 of the input shaft 10 has a reduced diameter portion 11b on the forward end portion which is slidably received in a corresponding central bore in the piston head member 28.

Figure 7:
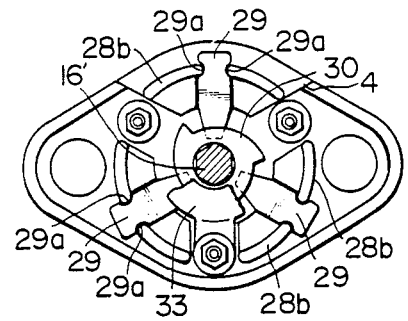
FIG. 7 is a partial transverse sectional view as viewed along line VII—VII in FIG. 6.
Figure 9:
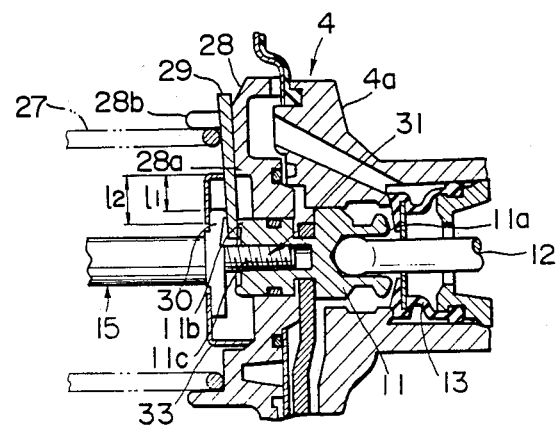
FIG. 9 is a partial view of FIG. 6 as an enlarged scale showing an operating condition.

The reaction disc 14 in the first embodiment is replaced by three circumferentially spaced levers 29 which are mounted, as shown in FIGS. 6, 7 and 9, on the piston head member 28 to act between the power piston 4, the output shaft 15 and the input shaft 10. A generally annular projection 28b having cutout portions is formed on the front surface of the piston head member 28, and reduced width portion 29a of each lever 29 is located, as shown in FIG. 7, in a cutout portion of the projection 28b. The radially outer end portions of the levers 29 receive the spring force of the return spring 27, and the generally outer half portions of the levers 29 abut the front surface of the piston head member in the non-actuated condition of the pneumatic booster as shown in FIG. 6. A generally annular and radially inwardly facing shoulder is formed on the front surface of the piston head member 28 to define fulcrums 28a for the levers 29. Radially inner end portions of levers 29 are adapted to contact with the forward end of the plunger 11 to transmit reaction force to the input shaft 10.

The output shaft 15 comprises a radially outwardly extending flange 30 and an axially extending reduced diameter portion 31 on the rear end portion and, on the front end portion, a hexagonally shaped portion 16' on a portion projecting outwards of the front shell 2. The flange portion 30 has, as shown in FIG. 7, three equivalent portions spaced from each other by a center angle of 120° and having a scroll-like configuration with the radial height thereof changing in the circumferential direction. The flange portion 30 defines the point of application of each lever 29 between the lever 29 and the output shaft 15, and the length between the fulcrum 28a and the flange portion 30 is denoted by l1 in FIG. 9. Thus, when the output shaft 15 is rotated around the axis thereof, the length l1 changes in response to the change in the radial height of the flange portion 30.

The pneumatic booster shown in FIG. 6 further comprises a plurality of, preferably two or three (only one is shown in FIG. 6) reinforcing rods 32 extending axially between front and rear shells 2 and 3 and through the power piston 4 and the diaphragm 6. An extendable and contractible tubular seal member surrounds the rod 32 in the front chamber A to prevent the leakage of air from the chamber B to the chamber A. The functions of the rods 32 in preventing the deformation of the housing 1 and increasing the strength and rigidity of the housing are publicly known. However, according to the invention, the rods 32 effectively prevent the rotation of the power piston 4 when the output shaft 15 is rotated by the rotating mechanism 23.

Figure 8:
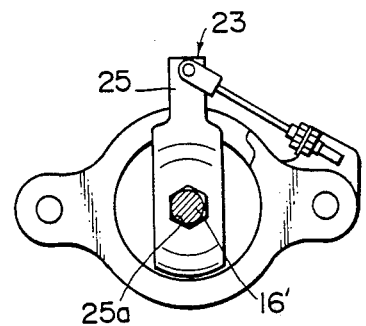
FIG. 8 is a partial transverse sectional view as viewed along line VIII—VIII in FIG. 6.

The rotating mechanism 23 shown in FIG. 8 includes a lever 25 having a central opening 25a for engaging with the hexagonally shaped portion of the output shaft 15, and axially extending portions being rotatably guided by the inner circumference of a cylindrical recess in the forward end wall of the front shell 2. A suitable actuating device is connected to the lever 25 to rotate the lever 25 by a center angle of about 100 degrees.

In operation, a differential pressure generated between chambers B and A moves the power piston forwards or leftward direction in FIG. 6. The output force is transmitted to the output shaft 15 through levers 29 and, reaction force is transmitted to the input shaft 10 through levers 29. Assuming that the length between the fulcrum 28a and the point of application on the plunger 11 is l2, as shown in FIG. 9, then, the ratio between l1 and l2 defines the "boost ratio" or the ratio between the output force and the input force. According to the embodiment, the length l1 and, accordingly, the boost ratio can be adjusted in a stepless fashion.

The flange portion 30 may be modified to have two or more sets of circumferentially spaced projecting portions with the radial height of each set of projecting portions being different from one another so that the length l1 can be adjusted stepwise.

As described heretofore, according to the invention, the output force of the pneumatic booster with respect to a given input force can be adjusted by rotating the output shaft, it is possible to adjust the braking effect to match the loading condition of the vehicle thereby improving the safety in driving the vehicle.

What is claimed is:

1. A pneumatic booster comprising a housing, power piston including means for partitioning the interior of the housing into a front chamber and a rear chamber, means for connecting said front chamber permanently to a source of a first reference pressure, a valve mechanism for selectively connecting said rear chamber with said front chamber and a source of second reference pressure which is higher than the first references pressure, an output shaft receiving an output force from said power piston, an input shaft coupled with said valve mechanism for receiving an input force and for actuating said valve mechanism in response thereto and engagable by said output shaft for receiving the reaction force of the output force, reaction force changing means on said output shaft for changing the reaction force transmitted to the input shaft with respect to the output force, said changing means having a lever mounted on the front surface of the power piston and extending radially with respect to the input and the output shafts, said front surface having a portion against which said lever engages as a fulcrum for said lever, a radially outwardly extending flange fixedly mounted on said output shaft, said lever having a first portion abutting the input shaft and a second portion abutting the outer circumferential portion of said flange, said first portion being located radially inwards of said second portion, said flange having different radial dimensions at different positions around the circumference thereof for, when said output shaft is rotated, shifting the position of said second portion in the radial direction so as to change the ratio of the distance between said first portion and said fulcrum to the distance between said second portion and said fulcrum, and means connected to said output shaft for rotating said output shaft around the axis thereof to different rotational positions.

* * * * *